July 10, 1956 B. LAZICH 2,754,500
REMOTELY CONTROLLED INDICATOR
Filed July 1, 1952 8 Sheets-Sheet 1

INVENTOR.
Branko Lazich.
BY W. L. Stout

HIS ATTORNEY

July 10, 1956

B. LAZICH 2,754,500

REMOTELY CONTROLLED INDICATOR

Filed July 1, 1952

INVENTOR.
Branko Lazich.
BY
W. L. Stout
HIS ATTORNEY

July 10, 1956

B. LAZICH 2,754,500

REMOTELY CONTROLLED INDICATOR

Filed July 1, 1952

INVENTOR.
Branko Lazich.
BY W. L. Stout.

HIS ATTORNEY

July 10, 1956 B. LAZICH 2,754,500
REMOTELY CONTROLLED INDICATOR
Filed July 1, 1952 8 Sheets-Sheet 4

INVENTOR.
Branko Lazich.
BY W. L. Stout.
HIS ATTORNEY

July 10, 1956  B. LAZICH  2,754,500
REMOTELY CONTROLLED INDICATOR
Filed July 1, 1952  8 Sheets-Sheet 5
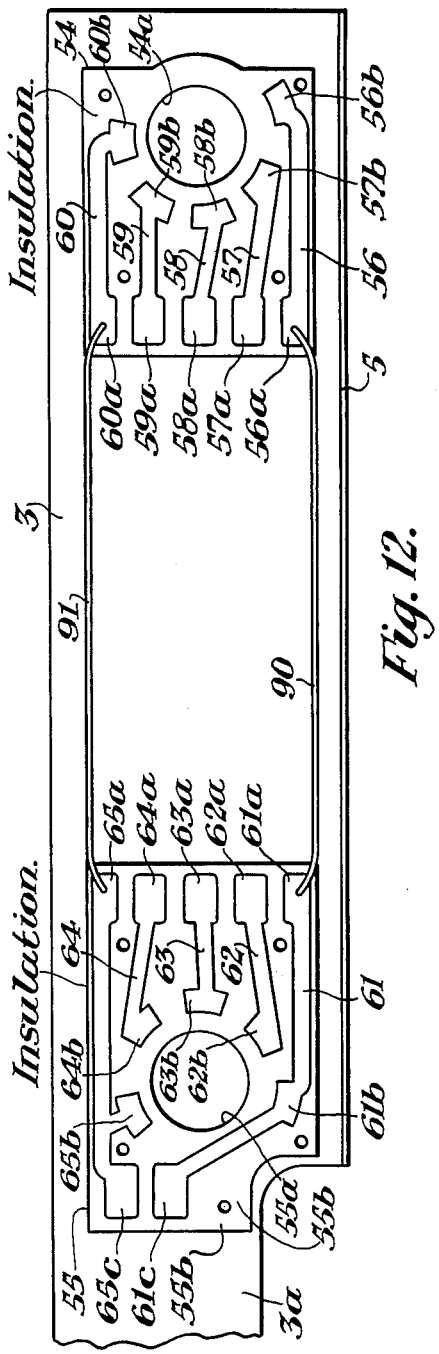
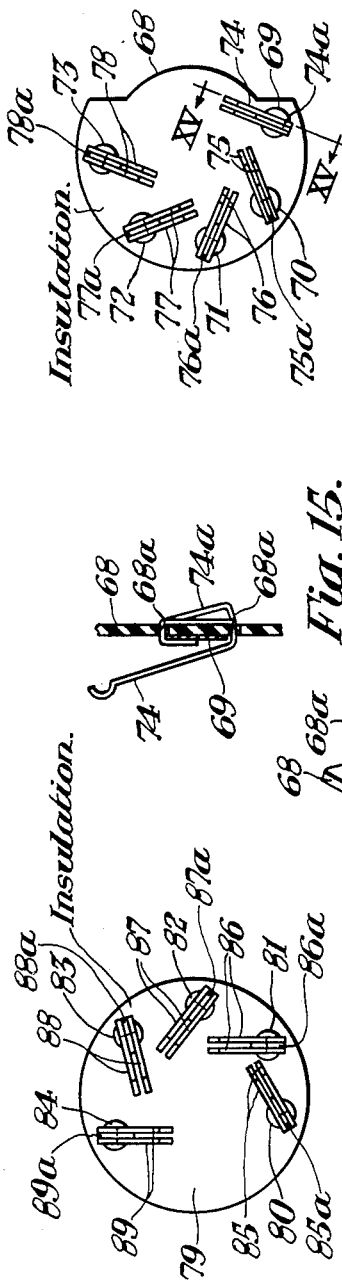
INVENTOR.
*Branko Lazich.*
BY *W. L. Stout*
HIS ATTORNEY

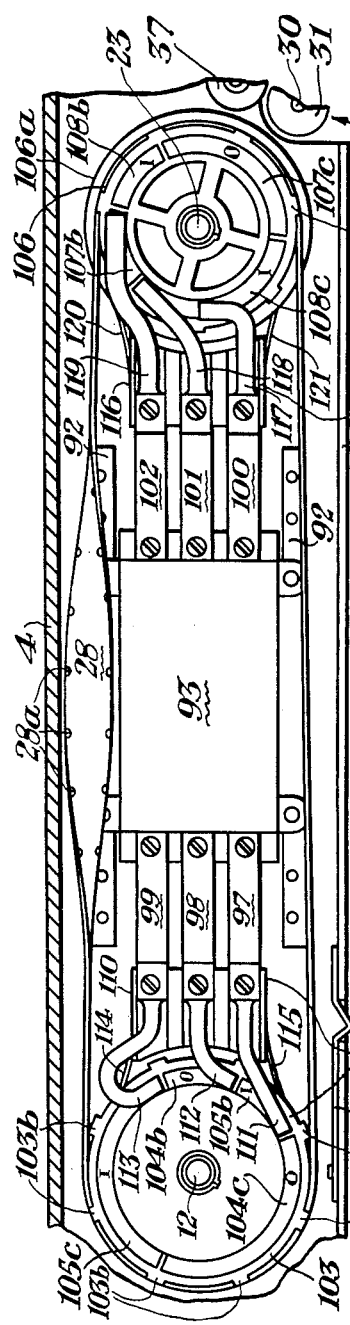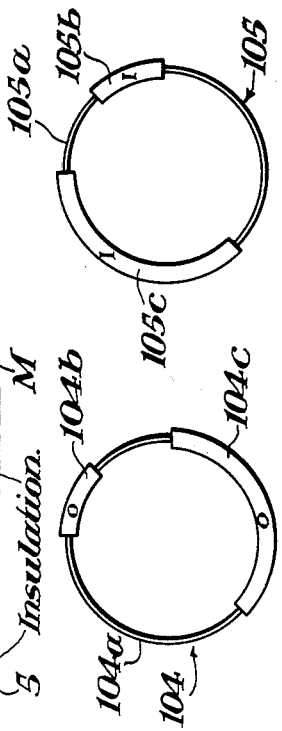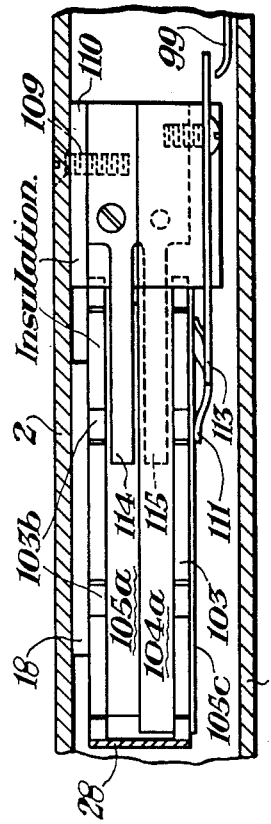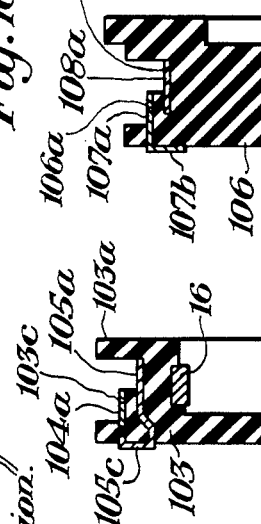

INVENTOR.
Branko Lazich.
BY W. L. Stout
HIS ATTORNEY

July 10, 1956   B. LAZICH   2,754,500
REMOTELY CONTROLLED INDICATOR
Filed July 1, 1952   8 Sheets-Sheet 8

INVENTOR.
Branko Lazich
BY W. L. Stout.
HIS ATTORNEY

_United States Patent Office_

2,754,500
Patented July 10, 1956

2,754,500

REMOTELY CONTROLLED INDICATOR

Branko Lazich, Wilkinsburg, Pa., assignor to Westinghouse Air Brake Company, Wilmerding, Pa., a corporation of Pennsylvania Application July 1, 1952, Serial No. 296,626

21 Claims. (Cl. 340—324)

This invention relates to remotely controlled indicators, and particularly to a small, compact indicator for use in a display panel or board wherein a plurality of indicators are arranged in juxtaposed rows and columns.

An indicator in accordance with my prevent invention is particularly well adapted for use in a display panel or board in information centers in railroad terminals or airports where train or plane information may be displayed for the general public using such transportation facilities, or for the particular use of the personnel primarily concerned with train or plane movements. A display panel or board comprising a plurality of my indicators may register such pertinent information as train or flight numbers, destinations, times of arrival and departure, or other information, as for example weather conditions. Such information may be transmitted to the selected indicators in the form of Teletype code signals from various remote points and registered by the indicators. Due to changing conditions, information registered by a row or column of indicators must be revised or corrected from time to time, so that an indicator of any particular row or column must be capable of individual operation. Such indicators should preferably be capable of sensing the registered information so that such information may be retransmitted to one or more distant points by means of conventional Teletype apparatus.

It is therefore an object of my invention to provide an indicator of the general character indicated which shall be extremely small and compact in size, quiet in operation, and consist of relatively few parts, and which shall be relatively inexpensive to manufacture.

Another object of my invention is to provide an indicator in which the number of the different characters or symbols displayed may be increased or decreased in accordance with the particular need by relatively few and simple changes in the operating mechanism of the indicator.

A further object of the present invention is to provide an indicator with circuit making elements whereby a large number of characters or symbols may be displayed through the use of relatively few control wires.

Yet another object of my invention is to provide an indicator of the general character indicated with switching means for connecting the circuit making elements of the indicator to a source of coded energy whereby said indicator becomes operative to display a particular character or symbol in accordance with the coded energy received.

Still another object of this invention is to provide an indicator with means whereby the particular character or symbol to be displayed will at all times be centered in the viewing space provided for the indicator.

According to my invention, a small casing of magnetic material is provided wherein two rotatable sprocket wheels of slightly different diameters are mounted, the sprocket wheels carrying an endless belt suitably notched to cooperate with said sprocket wheels to advance said belt to predetermined positions. The belt is divided into a number of equal spaces, each of the belt spaces carrying a suitable character or symbol to be displayed. The surface of the wheels upon which the belt travels is made equal to different integral numbers of belt spaces, and the total number of belt spaces is equal to the product of the numbers of the spaces on the two wheels. The number of spaces on each wheel is so selected that the wheels have a characteristic relative position for each different belt position. The belt is of the so-called "Moebius" type, characterized by the fact that characters or symbols are carried on both sides, one end of the belt being twisted 180° before the ends thereof are secured together in manufacturing the same. The Moebius belt thus provided is one half as long as a normal belt divided into the same number of spaces. In the detailed description hereinafter made, the Moebius belt is provided with fifty-six spaces on a belt which is actually twenty-eight spaces long and its over-all length is about twelve and one-half spaces when the belt is in position on the sprocket wheels. The housing of the indicator may thus be made very small and yet provide space for a belt carrying a great number of characters or symbols.

As more fully illustrated and described in the copending application of Elbert W. Marlowe and Lloyd V. Lewis, Serial No. 268,022, filed on January 24, 1952, for Display Indicator and Control System, and assigned to the common assignee, the belt is movable from one selectable position to another in response to transmitted energy in different binary code combinations. In the present application a magnetic clutch forming a part of the indicator is substituted for the motor drive illustrated in the aforesaid copending application, the magnetic clutch when energized connecting one of the sprocket wheels to a rotating shaft to advance the Moebius belt. The magnetic clutch is energized by supplying coded energy to one or more different circuit making elements operative by sprocket wheels. Each of the circuit making elements is so arranged that it either opens or closes a branch of the energizing circuit of the magnetic clutch in each of the wheel positions. The circuit making elements of both sprocket wheels cooperate in such a manner that the energizing circuit for the clutch magnet is open only when the belt is in a position to display a particular character or symbol in accordance with the code signal supplied to the control wires.

To insure the proper positioning of a particular character or symbol carried by the belt, I provide one of the sprocket wheels with a detent whereby the particular character or symbol is always centered in the viewing space provided. The detent comprises a magnetizable ring carried by one of the wheels and formed with a number of pole faces equal to the belt spaces provided on the sprocket wheel. Cooperating with the magnetizable ring is a stationary permanent magnet, the pole faces of which cooperate with the pole faces of the ring to center and hold the belt space centered in the allotted viewing space.

Within the small space of the indicator casing so far described, I also provide a relay means whereby the circuit making elements operative by the sprocket wheels are individually connected to one of a group of control wires connected to a source of coded energy. In this way I provide an indicator in which the selectable connector relay for the particular indicator and the controlling circuit making elements of the indicator are enclosed in a unitary casing which may be readily installed or removed from a display panel or board, as will hereinafter appear.

Other objects and advantages of my invention will become apparent as the description proceeds.

I shall describe two forms of indicators embodying my invention, and shall then point out the novel features thereof in claims.

In the drawings,

Fig. 12 is a sectional view taken along the line XII—XII of Fig. 2 illustrating two bus bar supporting plates secured to the side wall 3 of my indicator.

Figs. 13 and 14 are detail views of brush supporting plates cooperating with the bus bar supporting plates of Fig. 12, and with circuit making elements illustrated in Figs. 11 and 10, respectively.

Fig. 15 is a sectional view taken along the line XV—XV of Fig. 14, while Fig. 15A is an isometric view illustrating the manner in which the commutator brushes are assembled on the brush holder plate.

Fig. 16 is a partial side elevational view of a second embodiment of my invention, a side wall of the casing being removed to illustrate the details of construction.

Fig. 17 is a vertical section of the front wheel of the indicator of Fig. 16.

Figs. 18 and 19 are detail views of the outer and inner rings for the front wheel.

Fig. 20 is a vertical section of the rear wheel of the indicator of Fig. 16.

Fig. 21 is a top view of the brush holder block for the front wheel.

Fig. 24 is a fragmentary view in isometric projection of a double Moebius belt arrangement and a reflective light source, while

Figure 1:
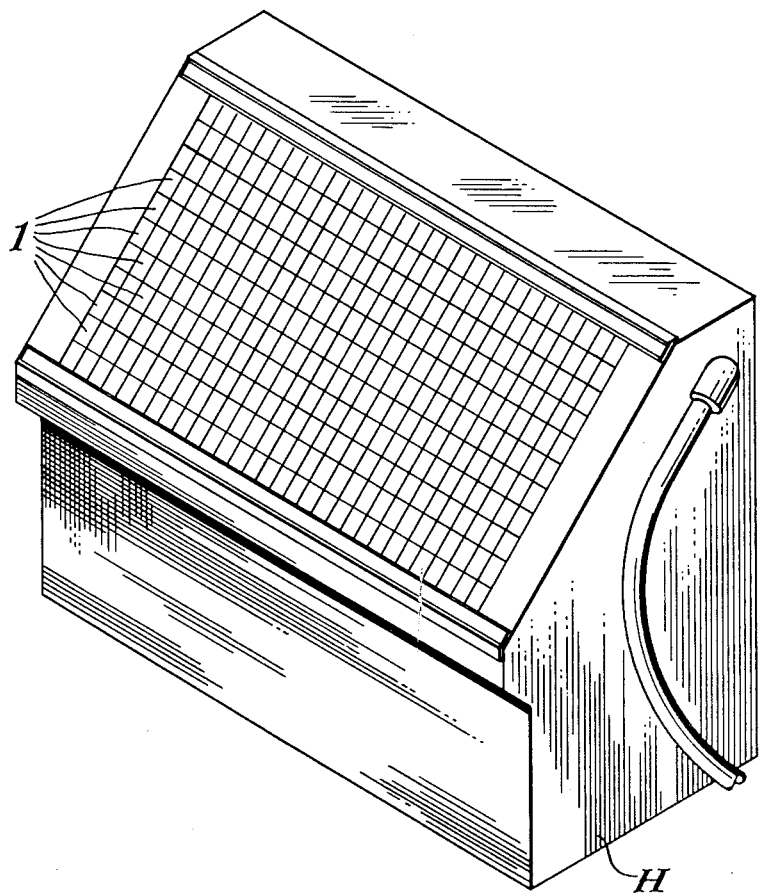
Fig. 1 is an isometric view of a cabinet or housing wherein a plurality of indicators embodying my invention are supported in closely spaced rows and columns.
Figure 4:
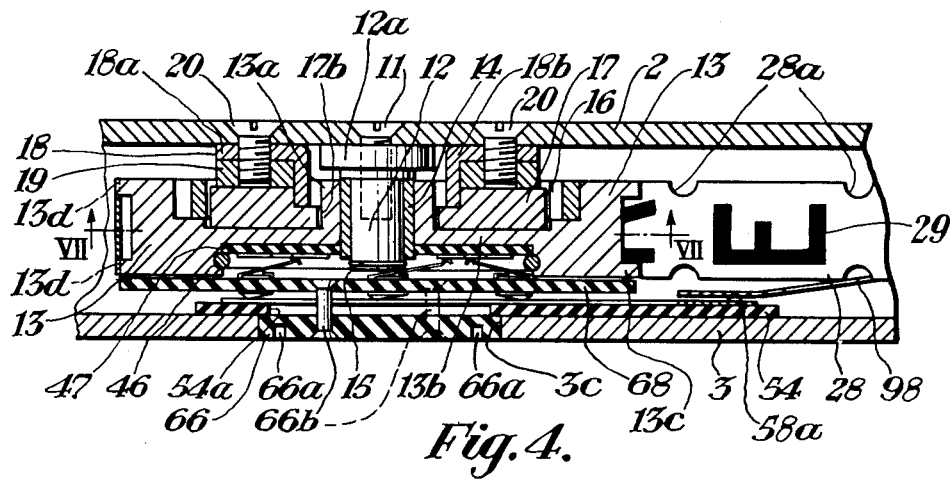
Fig. 4 is a sectional view taken along the line IV—IV of Fig. 3.
Figure 5:
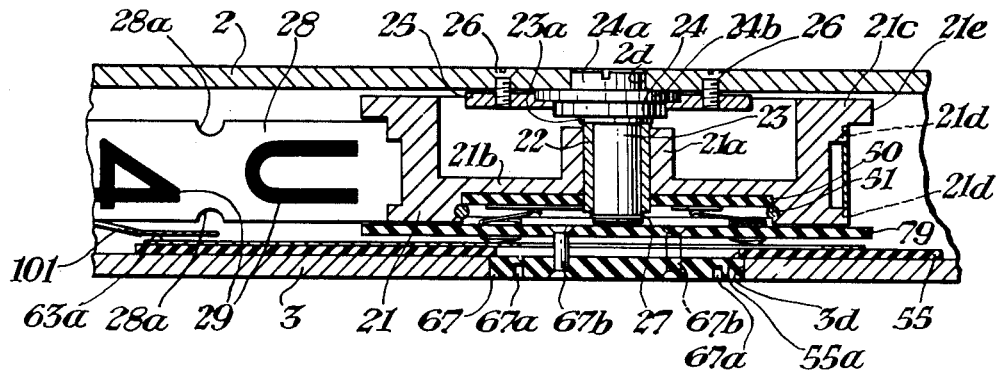
Fig. 5 is a sectional view taken along the line V—V of Fig. 3.

In a system wherein pertinent train or flight information is displayed, as for example, train or flight numbers, arrival and departure times, track or runway numbers, etc., a plurality of indicators 1 embodying my invention are mounted in tiered banks in a suitable housing H as illustrated in Fig. 1. The housing H is provided with a supporting grid (not shown) for the indicators, each indicator being positioned within an interstice of the grid support. The indicator 1 (Figs. 2 and 3) embodying my invention is enclosed in a casing C preferably made of magnetic material such as steel. The casing C is of rectangular cross-section and comprises two side walls 2 and 3, a top wall 4 and a bottom wall 5; the top wall 4 and side wall 2, and the bottom wall 5 and side wall 3 being integral. The side walls 2 and 3 are cut away at their rear ends to form reduced end portions 2a and 3a, respectively. The side wall 2 (Fig. 6) is formed with a shallow recess 2b on its inner surface adjacent to the front end thereof and the bottom wall 5, while the side wall 3 is provided with a similar shallow recess 3b on its inner surface adjacent to the front end thereof and the top wall 4. The side wall 3 is further provided with spaced circular openings 3c and 3d (Figs. 4 and 5). The top wall 4 is coextensive with the side walls 2 and 3, while the bottom wall 5 is coextensive with the side walls from the front ends of the walls to the reduced end portions thus leaving an inverted U-shaped opening in the rear end of the casing C.

Figure 6:
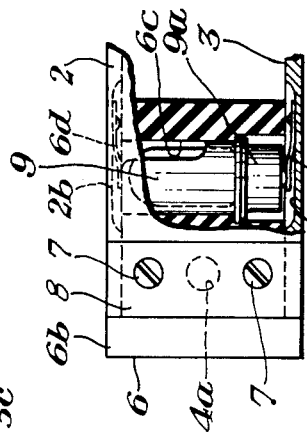
Fig. 6 is a fragmentary enlarged view of the front end of the indicator, portions of which are broken away to illustrate details of construction.

The front ends of the top and bottom walls 4 and 5 are each formed with a central opening, only opening 4a in the top wall 4 being illustrated in Fig. 6. Slipped into the front end of the casing C is a molded cover member 6 provided with a concave, transparent viewing surface 6a at its central portion and formed with upper and lower extensions 6b. The cover member 6 is further formed with transversely disposed recessed openings 6c (Figs. 3 and 6) which register with small contact springs 6d in the shallow recesses 2b and 3b in the side walls of the casing when the cover member is properly positioned within the casing. The cover member 6 is further formed with vertically extending through openings 6e in the upper and lower extensions 6b thereof which register with the centrally positioned openings (4a) of the top and bottom walls of the casing. The cover member 6 is secured to the casing C by self tapping screws 7 which pass through the ends of two small plates 8 adjacent the front ends of the top and bottom walls of the casing, through the top and bottom walls and into the body of the cover member 6. A reflector 9 of suitable conducting material is secured within each of the recessed openings 6c of the cover member, a light bulb 9a being received within each of the reflectors. Circuit connections for the light bulbs are made through the reflectors and the contact springs 6d in the recesses 2b and 3b of the side walls. The light of the bulb 9a is reflected downwardly and to the rear of the viewing surface 6a by the reflector 9 to illuminate the intelligence carried by an endless belt which is adapted to pass and to be positioned behind the viewing plate in the manner hereinafter described.

To insure proper alignment of the indicators in the housing H, a flat spring 10 is riveted to the inner surface of the bottom wall 5 of the casing C, a crimped median portion 10a protruding through an opening 5c in the bottom wall. The protruding portion 10a of the spring registers with a suitable opening (not shown) in the grid support of the housing H to align and hold the casing C in place. In the maintenance of the housing H, the indicators may be removed by means of expanding tongs, the ends of which are inserted in the openings 6e of the cover member 6 and the registering openings (4a) of the top and bottom walls of the casing C. An indicator may thus be easily withdrawn from the housing H and another indicator snapped into place.

Secured to the side wall 2 of the casing C adjacent the front end thereof, as by a screw 11, is a shaft (Fig. 4) formed with an abutment portion 12a which abuts the inner side of the wall. Rotatably mounted on the shaft 12 is a sprocket wheel 13 which is preferably made of aluminum. In view of the poor bearing qualities of aluminum, the wheel 13 is provided with a suitable bushing 14, preferably of nickel silver. The wheel 13 is formed with an extending hub 13a, a web 13b and a flanged rim 13c, the rim and hub of the wheel forming a relatively deeper annular recess on one side of the web than on the other side of the web. The hub of the wheel abuts the abutment portion of the shaft 12 and the wheel is held in place on the shaft by a snap ring 15. The flanges of the rim are formed with eight equally spaced pairs of radially extending, semicircular projections 13d (Figs. 2, 3 and 4) which serve to engage the edges of a belt, as will hereinafter appear.

Figure 7:
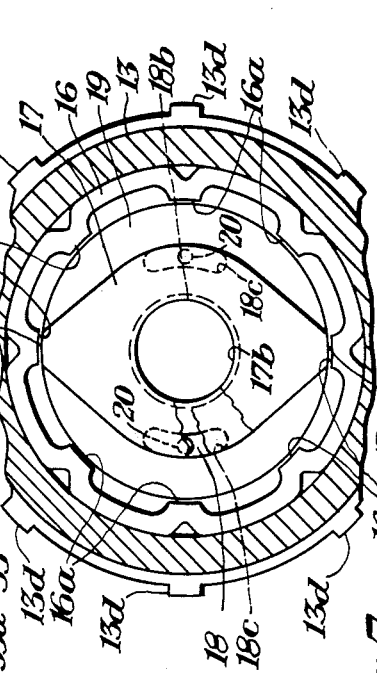
Fig. 7 is an enlarged sectional view of the front wheel assembly of the indicator taken along the line VII—VII of Fig. 4, parts of which are broken away to better illustrate assembly details.

Press fitted into the recess of the wheel 13 between the flanged rim and the hub is a ring 16 (Fig. 7) of magnetic material, such as iron. The ring 16 is formed with eight equally spaced inwardly projecting pole faces 16a which are in radial alignment with the semicircular projections 13d on the wheel rim. The iron ring and its pole faces are adapted to cooperate with a stationary permanent magnet 17 which lies within the larger recess of the wheel 13. The permanent magnet 17 is substantially circular in shape being formed with two diametrically extending pole faces 17a and a recessed circular through opening 17b of sufficient diameter to accommodate the hub 13a of the wheel with some clearance.

The permanent magnet 17 (Fig. 4) is secured to the side wall 2 of the casing C in an adjustable manner so that the pole faces 17a of the magnet may be adjusted with respect to the pole faces 16a of the magnetic ring. To this end there is provided an eyelet 18 of nonmagnetic material, such as brass, comprising a circular flat portion 18a which engages the inside surface of side wall 2, and a hub portion 18b extending inwardly toward the wheel 13. The flat portion 18a of the eyelet is formed with two arcuate slots 18c (Fig. 7), the eyelet being clamped to the side wall by a lock ring 19, also of nonmagnetic material, and nonmagnetic screws 20. The screws 20 pass through the side wall 2 of the casing C and the slots 18c of the eyelet and are threaded into the lock ring. The permanent magnet 17 is force fitted over the hub portion 18b of the eyelet, the permanent magnet being held within the magnetizable ring 16 and in the same plane therewith. Should it be necessary to reposition the pole faces of the permanent magnet with respect to the pole faces of the ring 16, the screws 20 may be loosened, the eyelet turned to the proper position and the screws retightened.

From the foregoing description of the front wheel 13, the magnetizable ring 16 and the permanent magnet 17, it will be appreciated that a novel detent mechanism is provided whereby the wheel 13 will be held in any desired position of the eight possible positions indicated by the eight pole faces 16a of the magnetizable ring. The wheel 13 in turning or in being turned will pass through the eight possible positions. In each of the eight positions, the outwardly extending permanent magnet pole faces will be in juxtaposition with a diametrically opposed, inwardly extending pair of pole faces of the magnetizable ring, in which position a strong magnetic attraction between permanent magnet and magnetizable ring will exist. Upon release of the driving force of the front wheel, the permanent magnet 17 will hold the wheel in the selected position. Should the pole faces of magnet 17 be out of alignment with a pair of ring pole faces when the driving force is removed from the wheel 13, the magnetic force of the permanent magnet will attract the nearest diametrically opposed pair of ring pole faces to move the wheel 13 to its proper position. The magnetic locking of the wheel 13 in a definite position is extremely useful in displaying data which may be carried on the wheel itself or on a belt driven by the wheel and which data is to be viewed through an opening only sufficiently large to exhibit such data. By the magnetic locking provided, the data on the wheel or belt will always register properly in the viewing opening of the indicator.

A rear wheel 21 (Fig. 5) similar in most respects to the front wheel 13 is rotatably mounted toward the rear of the casing C. The rear wheel 21 is formed with a hub 21a having a bushing 22, a web 21b and a flanged rim 21c; the flanged rim however being formed with seven equally spaced pairs of radially extending, semicircular projections 21d instead of eight pairs of projections as on the front wheel. It should be noted that the spaces between adjacent projections 21d are equal to the spaces between adjacent projections 13d of the front wheel 13. The rear wheel 21 is thus slightly smaller in diameter than the front wheel 13. The rear wheel is further provided with an integral driving rim 21e which is of greater diameter than the wheel and its projections.

For purposes hereinafter appearing, the rear wheel 21 is rotatably mounted on an eccentrically mounted shaft 23 secured to the inner surface of the side wall 2 of the casing C. The shaft 23 is formed with an enlarged end 23a which is made integral with but eccentrically positioned on a circular, stepped abutment member 24. The end 24a of the member 24 is slotted and is of smaller diameter than the intermediate portion 24b, the slotted end extending through suitable opening 2d in the side wall 2 of the casing. A circular, stepped clamping ring 25 clamps the intermediate portion 24b to the side wall 2 by means of screws 26 passing through the side wall and threaded into the clamping ring. The rear wheel 21 is held in place on the shaft 23 by a snap ring 27.

Passing over the front and back wheels 13 and 21 of the indicator is an endless belt 28 made of a suitable material and divided by suitable sprocket notches 28a into a number of spaces equal to the product of the numbers of spaces on the front and rear wheels. In the particular embodiment illustrated herein, the belt 28 is provided with fifty-six spaces. As previously indicated, the belt 28 is a Moebius belt having printed thereon, or otherwise suitably applied thereto on both sides, suitable characters or symbols 29 in the spaces provided. The Moebius belt is therefore twenty-eight spaces long and provided with fifty-six spaces for the required characters or symbols. The seven and eight position wheels provided for the Moebius belt will have the required characteristic relative positions for each different belt position behind the viewing surface 6a. It will be readily appreciated that each of the seven positions of the rear wheel comes in alignment only once with each of the eight spaces of the front wheel in the fifty-six possible positions of the belt.

The fifty-six position Moebius belt 28 described is by way of example, and it will be readily appreciated that by increasing or decreasing the number of spaces of the front and rear wheels other combinations are possible.

To install the Moebius belt 28, the distance between the center lines of the front and rear wheels is decreased by use of the eccentric mounting provided for the rear wheel. The screws 26 are first loosened and unclamp the stepped abutment member 24 so that this member may be turned with a screw driver inserted in the slotted end 24a. Due to the eccentric mounting of the shaft 23, the shaft 23 will be rotated toward the front of the casing C. The Moebius belt may then be slipped over the wheels and the shaft 23 rotated toward the back of the casing, thereby tightening the belt. The screws 26 may then be tightened to clamp the abutment member 24 to the side wall 2 with the clamping ring 25. It will be appreciated that the eccentric mounting of the shaft 23 may also be used as a take-up means for taking up any slack which may occur in the Moebius belt.

Figure 8:
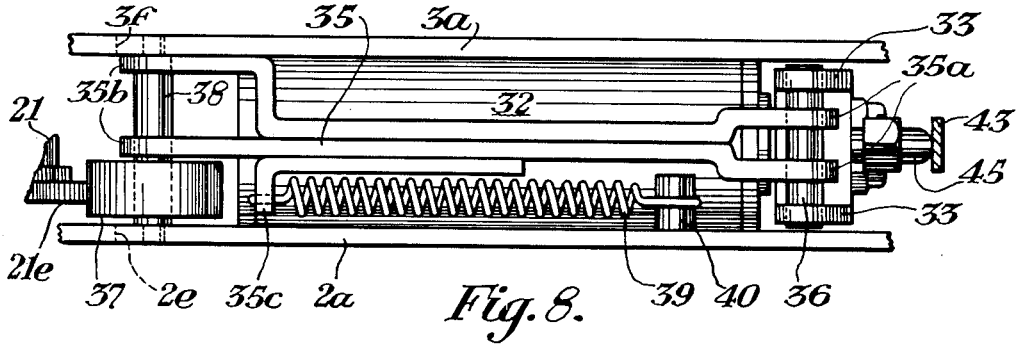
Fig. 8 is a bottom plan view of an electromagnetic clutch incorporated in my novel indicator.

To drive the Moebius belt 28 so that the desired character may be displayed, I provide a number of horizontally disposed, continuously rotating shafts 30 (Fig. 3) for the housing H, a horizontal shaft being provided for each bank of indicators. The rotating shafts 30 are provided with a plurality of driving wheels 31 secured thereto. Secured within the inverted U-shaped opening formed between the reduced ends 2a and 3a of the side walls of the casing, is an electromagnetic clutch mechanism M comprising an electromagnet 32 (Figs. 2, 3 and 8), secured to the side wall portions 2a and 3a, and an armature 33 pivoted on a pin 34 secured in suitable openings in the side wall portions 2a and 3a. Pivoted to the free end of the armature is an arm 35 having bifurcated ends 35a and 35b, The bifurcated end 35a of the arm is pivoted on a pin 36 carried by the free end of the armature 33. The bifurcated end 35b of the arm carries an idler wheel 37 rotatably mounted on a shaft 38 which passes through the bifurcated end of the arm, the idler wheel being mounted between the side wall portion 2a and the bifurcated end (Fig. 8). The ends of the shaft 38 are slidably received in slots 2e and 3f provided in the side wall portions 2a and 3a of the casing. Secured to the arm 35 adjacent the bifurcated end 35b and spaced from the idler wheel 37 is an extension 35c. Secured at one end to the arm extension 35c is a return spring 39. The other end of the return spring is fixed to a pin 40 secured to the inner face of the side wall portion 2a of the casing. The bias of the return spring 39 tends to move the arm 35 to the right as viewed in Fig. 3, thereby disengaging the idler wheel 37 from the driving wheel 31 and the driving rim 21e of the rear wheel.

Figures 2, 3:
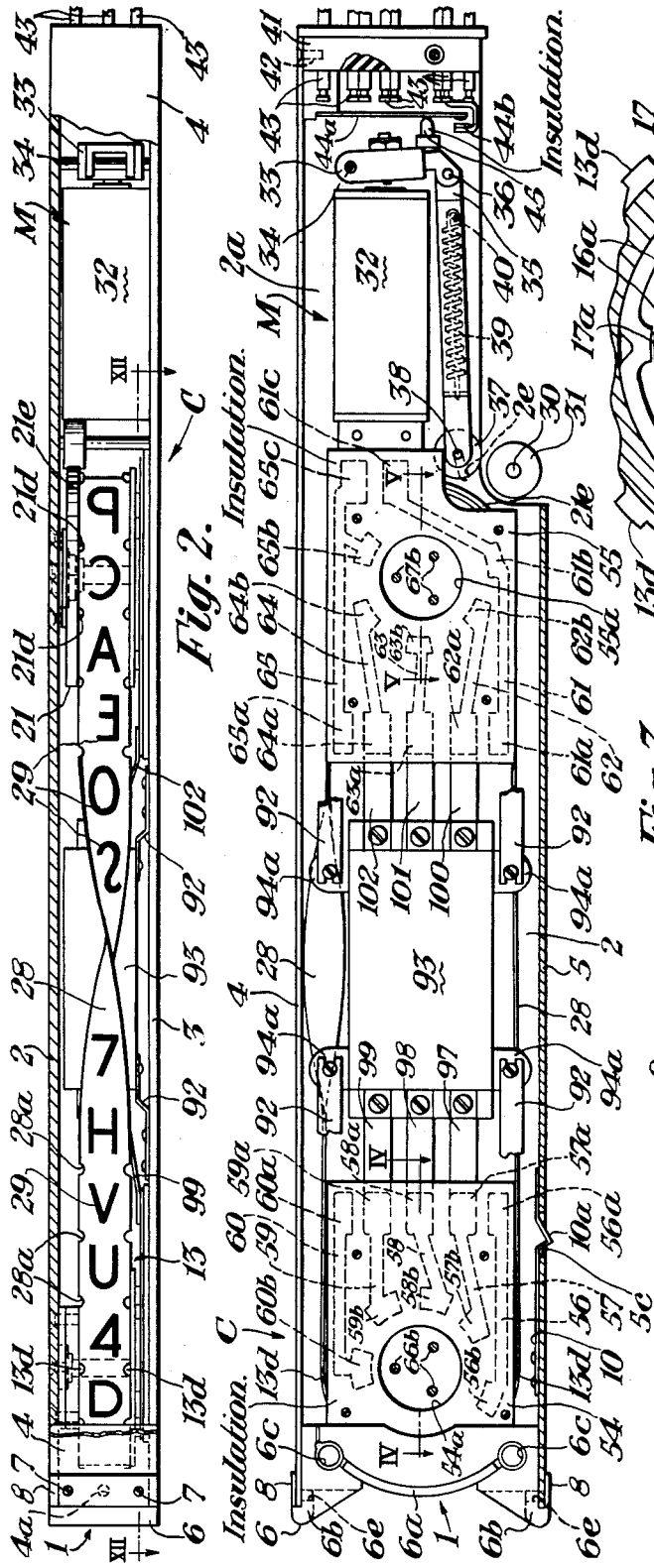
Fig. 2 is a top plan view of a data indicator embodying my invention, the top plate of which has been broken away to show the assembly of parts.
Fig. 3 is a side elevational view of my novel indicator, a side wall being removed to illustrate to better advantage the organization of the indicator.

Upon energization of the electromagnet 32, the armature 33 will be rotated clockwise to move the arm 35 to the left as viewed in Fig. 3. The idler wheel will thus engage both the continuously rotating driving wheel 31 and the driving rim 21e of the rear wheel to rotate the rear wheel. The rotation of the rear wheel will drive the Moebius belt 28 and the front wheel 13. The characters carried by the Moebius belt will thus be moved past the viewing plate 6a of the cover member. Upon deenergization of the electromagnet 32 in a manner to be described the spring 39 will disengage the idler wheel 37 from the driving wheel 31 and the rear wheel driving rim 21e. The Moebius belt will then be brought to a halt, the magnetic detent 16, 17 centering a particular character 29 in the rear of the viewing plate 6a.

For purposes hereinafter appearing, a terminal connector block 41 (Fig. 3) of insulation material is secured within the inverted U-shaped recess formed by the side wall portions 2a and 3a and the top wall 4 as by screws 42. Molded within the connector block 41 are a plurality of prong connectors 43 to provide the necessary circuit connections for the indicator. Secured to the inner side of the block 41 is a spring contact finger 44a normally biased toward a fixed contact 44b also secured to said block. A button 45 of suitable insulation material is fixed to the unpivoted end of the armature 33 and in alignment with the spring contact finger 44a. Along as electromagnet 32 is deenergized, the button 45 will hold the contacts 44a—44b open. When the electromagnet is energized, the clockwise rotation of the armature (Fig. 2) and the button 45 will permit the contact 44a—44b to close.

The Moebius belt 28 illustrated in the drawings herein is provided with fifty-six possible spaces for the characters 29. In order that the belt may be advanced and positioned so that a predetermined character carried by the belt will be exhibited through the viewing plate 6a it is necessary to provide means for controlling the energization and deenergization of the electromagnet 32. To this end, I provide circuit making elements for both wheels of the indicator in the form of commutator and brush arrangements whereby branch circuits for energizing the electromagnet 32 are opened and closed in response to the coded signals received from a remote point, the electromagnet becoming deenergized when the combinations of circuits closed by the circuit making elements of the wheels match the particular code combinations received.

Figure 10:
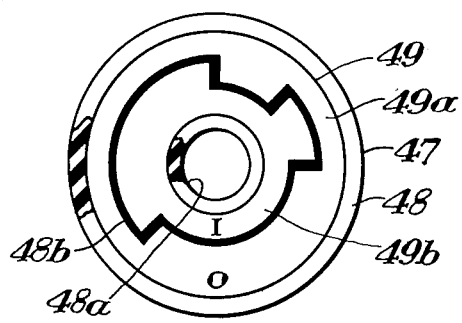
Figs. 10 and 11 are detail views of circuit making elements forming a part of the front and rear wheel assemblies incorporated in the indicator.

The front and rear wheels of the indicator are provided with commutators adapted to be engaged by a plurality of stationary brushes to provide the various combinations of electrical circuits required to control the advance of the Moebius belt. Fitted into the shallower recess of the front wheel 13 and held in position by a snap ring 46 is a commutator 47 (Figs. 4 and 10) comprising a plate 48 of insulation material, having a centrally disposed opening 48a to accommodate the short extending end of the bushing 14. Deposited or printed on the outer surface of the plate 48 is an electrically conducting layer 49. The layer 49 constitutes the commutating surface over which the brushes will ride and comprises an outer continuous ring 49a adjacent the outer periphery of the plate, marked "O" in the drawings, and an inner continuous ring 49b adjacent the central opening 48a, marked "I" in the drawings. The intermediate portion of the layer 49 is discontinuous, being separated into segments of different circumferential lengths by an exposed, continuous line portion 48b of the insulation plate. Thus a brush riding over the commutating surface adjacent the outer periphery will always be connected to the outer ring 49a, while a brush riding over the surface adjacent the central opening 48a will always be connected to the inner ring 49b. A brush riding over the intermediate portion of the commutating surface will be connected first to the outer ring 49a and then to the inner ring 49b dependent upon the angular positions the plate moves through with respect to the brush. In Fig. 10, a brush riding over the intermediate portion of the commutator rotating in a clockwise direction would be connected to the inner ring 49b for the first three-eighths of a revolution, and then to the outer ring 49a for the next three-eighths of a revolution. For the next eighth of a revolution, the brush would be connected to the inner ring 49b and for the last eighth of a revolution to the outer ring 49a.

Figure 11:
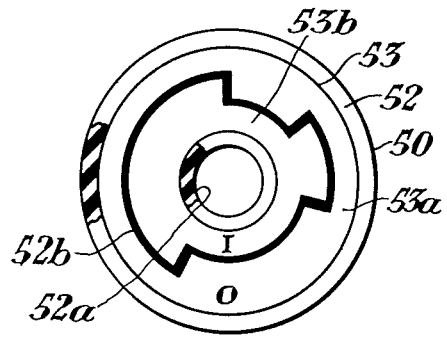

The rear wheel 21 is provided with a similar commutator 50 held in the shallow recess of the wheel by a snap ring 51 (Figs. 5 and 11). The commutator comprises an insulation plate 52 having a centrally disposed opening 52a. A commutating surface 53 is provided for the plate 52 by which a continuous outer ring 53a of conducting material and a continuous inner ring 53b of conducting material are provided. The intermediate portion of the commutating surface is separated into segments by an exposed, continuous line portion 52b of the insulation plate.

As in the case of the commutator 47 for the front wheel, the commutator 50 for the rear wheel provides a continuous ring of conducting material for brushes riding adjacent to the outer periphery of the commutating surface 53 and adjacent to the inner edge of the commutating surface. The intermediate portion of the commutating surface 53 between the outer ring 53a and the inner ring 53b provides a slightly different switching arrangement for a brush riding over the intermediate portion of the commutating surface. Assuming clockwise rotation of the commutator 50 (Fig. 11), a brush riding over the intermediate portion of the commutating surface 53 will be connected to the inner ring 53b for three-sevenths of a revolution, and then connected to the outer ring for two-sevenths of a revolution. The continued rotation of the commutator will then connect the brush riding over the intermediate portion to the inner ring 53b for one-seventh of a revolution and then to the outer ring 53a for the last seventh of the complete revolution.

For purposes hereinafter appearing, there is riveted to the inner surface of the side wall 3, two bus bar plates 54 and 55 (Figs. 3 and 12). The bus bar plates are made of suitable insulation material, each of the plates being formed with a circular opening 54a and 55a, respectively. The openings 54a and 55a are of smaller diameter than the side wall openings 3c and 3d (Figs. 4 and 5), the bus bar plates being so secured to the side wall 3 that the openings 54a and 3c, and 55a and 3d are concentric.

Deposited or printed on the inner side of the bus bar plate 54 are five bus bars 56 to 60 of conducting material, the bus bars being formed with enlarged terminals 56a, 57a, etc. adjacent the inner end of the plate. The outer ends of the bus bars on plate 54 are also provided with enlarged terminals 56b, 57b, etc. which are arranged in a circular pattern about the opening 54a in the plate. The bus bar plate 55 is also provided with deposited or printed bus bars 61 to 65 of conducting material on its inner face, the ends of the bus bars adjacent to the inner edge of the plate being formed with enlarged terminals 61a, 62a, etc. The bus bars 62, 63 and 64 are formed with enlarged terminals 62b, 63b and 64b, respectively, at their outer ends adjacent the opening 55a in the plate 55. The bus bars 61 and 65 are formed with two enlarged terminals 61b and 61c and 65b and 65c, respectively, the terminals 61b to 65b being arranged around the opening 55a of the plate. The terminals 61c and 65c are adjacent to each other and to the reduced rearwardly extending portion 55b of the bus bar plate 55.

Fitted into the openings 3c and 3d of the casing side wall 3 are inserts 66 and 67, respectively, of insulation material (Figs. 4 and 5), the two inserts being capable of being rotated within the openings in the side wall as by a spanner wrench inserted into the recesses 66a and 67a formed in said inserts. Riveted to the insert 66 as by rivets 66b, is a brush support plate 68 made of suitable insulation material. It will be noted that the rivets 66b pass through the opening 54a provided in the bus bar support plate 54. The plate opening 54a being of smaller diameter than the opening 3c will permit the insert 66 to abut against the edges of the plate opening.

Deposited or printed on the surface of the brush support plate 68 (Fig. 14) away from the bus bar support plate 54 are five circular brush terminals 69 to 73 of conducting material. The brush terminals are disposed in a circular pattern and are angularly spaced so that the terminal 69 will be aligned with the terminal 56b of bus bar 56, the terminal 70 will be aligned with the terminal 57b of the bus bar 57, etc., when the brush support plate 68 is properly positioned and riveted to the insert 66. See Figs. 12 and 14. The brush support plate 68 is formed with five pairs of small openings 68a (Fig. 15), each pair of openings being adjacent to the brush terminals 69 to 73, the openings being on opposite sides of the terminals. Inserted through the openings 68a of the brush support plates are five pairs of contact brushes 74 to 78, the brushes being made of suitable wire, each pair of brushes being separated by a contact finger 74a, 75a, etc., respectively. The brushes and contact fingers are first formed in the shape of a U with one end longer than the other. The ends of each brush and one end of the contact finger are then passed through a pair of openings 68a (Fig. 15A) from the unplated side of the plate. The shorter ends of the wires forming brushes and contact fingers are then bent over the brush support plate and its corresponding brush terminal and soldered to the terminal, thereby securing one end of the brushes and contact fingers to the plate and forming an electrical contact with their respective terminal. The longer ends of the wires forming the brushes are bent to a suitable angle so that the ends of the brushes engage the proper portions of the front wheel commutator 47. The intermediate portion of the wire forming a contact finger is sprung so that this portion is biased away from the plate 68 toward the bus bar plate 54 as illustrated in Fig. 15. The free end of the contact finger remains in the other opening 68a, however, the free end being adapted to be urged through the opening 68a when the plate 68 is in position. When the brush support plate 68 is properly positioned, the median portions of each pair of brushes engage their corresponding bus bar terminals on plate 54. To insure that a proper electrical contact is made with the bus bar terminals, the spring contact fingers 74a—78a are provided to engage the terminals with some pressure, thus compensating for any minute differences in the diameters of the brushes or thicknesses of the deposited layers.

The brush terminals 69 and 73 of the brush support plate 68 are so spaced that the brushes 74 will engage the outer ring 49a of the front wheel commutator and brushes 78 will engage the inner ring 49b. The angular location of the brush terminals 69 and 73 and their corresponding brushes is of no import as long as the brushes engage their proper rings and the brush terminals 69 and 73 are aligned with the bus bar terminals 56b and 60b, respectively. The brush terminals 70, 71 and 72 on the other hand, are so positioned that their corresponding brushes 75, 76 and 77 engage the intermediate portion of the commutating surface 49 at points spaced one-eighth of a revolution apart.

The rear wheel commutator 50 is provided with a similar brush arrangement, for connection to the bus bars 61 to 65 of the bus bar plate 55. Riveted to the insert 67 in the side wall opening 3d of the casing as by rivets 67b is a brush support plate 79 of insulation material (Figs. 5 and 13). Deposited or printed thereon on the side away from the bus bar support plate are five circular brush terminals 80 to 84 provided with five pairs of brushes 85 to 89, each pair being separated by a contact finger 85a to 89a, respectively; the brushes and fingers being of wire and soldered at one end to their respective brush terminals in the same manner as described for the brushes 74 to 78 and fingers 74a to 78a. The brush terminals 80 to 84 are so positioned as to be aligned with the bus bar terminals 61b to 65b, respectively, the respective brushes and contact fingers engaging the proper bus bar terminals when the brush support plate 79 is properly positioned and secured.

Brush terminals 80 and 84 are so positioned that their respective brushes 85 and 89 engage the outer ring 53a and inner ring 53b, respectively, of the rear wheel commutator 50. The brush terminals 81, 82 and 83 are so positioned that their respective brushes 86, 87 and 88 engage the intermediate portion of the commutating surface 53 at points spaced one-seventh of a revolution apart.

The bus bars 56 and 60 of the front bus bar support plate 54 are connected to the bus bars 61 and 65 of the rear bus bar support plate 55 either by bus bars or wires 90 and 91 connected respectively to the bus bar terminals 56a, 61a and 60a, 65a. It will be noted that the bus bar terminals 56b and 61b which are connected by the brushes 74 and 85 to the outer rings 49a and 53a of the front and rear wheel commutators, are thus connected to the bus bar terminal 61c. The bus bar terminals 60b and 65b which are connected by way of brushes 78 and 89 to the inner rings 49b and 53b of the front and rear wheel commutators, are connected to the bus bar terminal 65c.

The bus bars 57 to 59 and 62 to 64 are connected to a source of coded energy by a novel relay structure which I will now describe.

Figure 9:
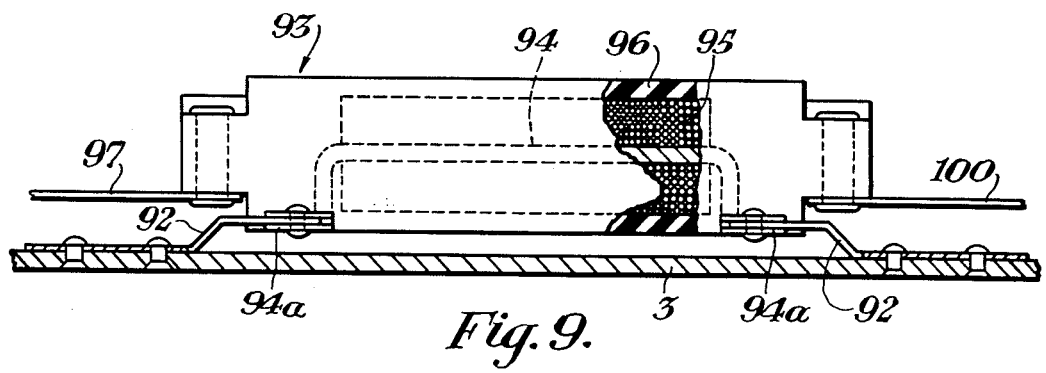
Fig. 9 is a side elevational view of a novel relay structure forming a part of the indicator, portions of the relay structure being broken away and shown in section to illustrate details of construction.

Referring in particular to Figs. 2, 3 and 9 of the drawings, there are riveted to the side wall 3 of the casing C two pairs of spaced leaf springs 92 preferably made of a nonmagnetic material such as beryllium copper. The outer ends of the leaf springs are riveted to the side wall while the inner ends, which are bent toward the center of the casing, support a relay coil structure 93. The relay coil structure comprises a shallow elongated U-shaped core 94 of magnetic material, formed with four foot portions 94a to which the free ends of the supporting leaf springs are secured. A coil 95 is wound about the elongated leg of the core 94, the coil and core assembly being subsequently molded in an enclosure 96 of insulation material. Fastened to each of the opposite ends of the enclosure 96 are three contact fingers 97 to 99 and 100 to 102. The contact fingers 97, 98 and 99 are adapted to engage the bus bar terminals 57a, 58a and 59a, respectively, while contact fingers 100, 101 and 102 are adapted to engage the bus bar terminals 62a, 63a and 64a, respectively, when the relay coil 95 is energized.

It should be noted that the supporting springs 92 bias the relay coil structure 93 away from the side wall 3 of the casing C. As previously described, the walls of the casing C are preferably of magnetic material so that the casing becomes a part of the magnetic circuit of the relay structure. Thus when the coil 95 is energized, the coil structure 93 will move toward the side wall of the casing, the contact fingers 97 to 102 engaging their respective bus bar terminals. Upon deenergization of the relay coil, the relay supporting springs 92 will return the relay structure to its initial position, thereby disengaging the contact fingers 95 to 100 from the bus bar terminals.

The various electrical elements of the indicator described are connected to the pronged connectors 43 of the terminal connector block 41 secured to the rear of casing C. The pronged connectors are adapted to engage matching socket connectors (not shown) located in the rear of each space allotted to an indicator in the housing H. The circuit elements of the indicator are thus readily connected to a source of coded energy. It will be readily appreciated by those skilled in the art that the indicator described herein is particularly suited for use in a six-unit binary code transmission system. It will be understood however that by suitable changes in the circuit making elements associated with the front and rear wheels of the indicator and appropriate changes in the Moebius belt, other unit codes may be used to operate the indicator.

Figure 22:
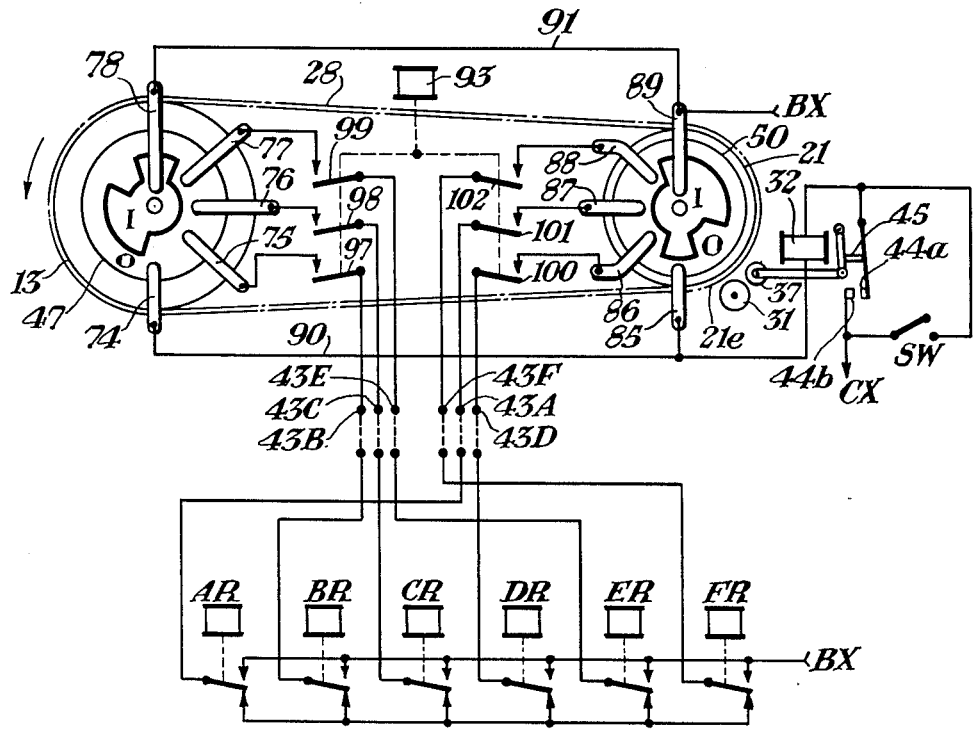
Fig. 22 is a schematic wiring diagram for the indicators disclosed.

In Fig. 22 of the drawings, I have shown a schematic wiring diagram of the circuit connections for the indicator described. The contact fingers 97 to 99 of relay 93 are connected to terminals 43B, 43C and 43E, respectively, of the terminal connector block 41, while the contact fingers 100 to 102 of the relay are connected to terminals 43D, 43A and 43F, respectively, of the block 41. When the indicator 1 is properly positioned within the housing H, the terminals 43A to 43F will be connected to the heel contacts of a bank of six code relays AR to FR, respectively. The bank of relays may be selectively energized in a well-known manner to represent different binary code signals. Energization of the relay 93 will connect the circuit making elements of the front and rear wheels to the heel contacts of the code relays. The interconnected brushes 74 and 85 engaging the outer rings of the commutators 47 and 50, respectively, are connected through the coil of the clutch magnet 32 and a starting switch SW to the negative terminal CX of a source of power, while the interconnected brushes 78 and 89 engaging the inner rings are connected to the positive terminal BX of the source of power.

The operation of the circuit illustrated in Fig. 22 is the same as the operation of the circuits described in the aforementioned application of Elbert W. Marlowe and Lloyd V. Lewis. The relay 93 herein illustrated is adapted to be selectively energized from a remote control point, the energization of this relay connecting the circuit making elements of the front and rear wheels to the code relays AR, BR, CR, etc. As illustrated in Fig. 22, the relays AR, BR, CR, etc. are deenergized and the circuit making elements of the front and rear wheels are shown in selected positions in accordance with the illustrated condition of the code relays.

It will be noted that the clutch magnet 32 is deenergized and will remain deenergized despite the closure of the starting switch SW in view of the closure of the back contacts of the relays AR, BR, CR, etc., and the engagement of all six brushes with the outer rings of their respective commutators. If we assume the energization of relay BR of the bank of relays in response to a particular code transmission, the front contact of relay BR will close to connect the contact finger 97 of the relay 93 to a positive terminal BX of the power supply. Upon energization of the selectively controlled relay 93 of the indicator, the brush 75 of the front wheel 13 will interconnect the outer ring of the commutator 47 with the positive terminal, thereby completing an energizing circuit for the clutch magnet 32 through the closed switch SW. The clutch M will thus be operated to connect the driving wheel 31 with the rim 21e of the rear wheel to advance the Moebius belt. The energization of the clutch magnet 32 will also permit the contacts 44a—44b to close to provide a holding circuit for the clutch magnet. The front and rear wheels of the indicator will be rotated to advance the Moebius belt, until the commutators of the front and rear wheels are rotated to positions wherein the energizing circuit of the clutch magnet is opened. The advance of the Moebius belt will be stopped in a position wherein the proper character or symbol representative of the code received is in viewing position. The selectively controlled magnet 93 may now be deenergized, or it may remain energized and the circuit making elements of the two commutators used to retransmit the received code to another remote point, as fully described in the aforesaid copending application.

For a detailed description of the operation of the circuit illustrated herein in response to various code combinations selectively energizing the relays AR, BR, CR, etc., reference may be made to the copending application of Elbert W. Marlowe and Lloyd V. Lewis.

In Figs. 16 to 21, I have illustrated another embodiment of my indicator. The indicator shown in Fig. 16 is similar to the indicator illustrated in Fig. 3, changes having been made in the form and composition of the front and rear wheels, and in the circuit making elements provided for the two wheels. The indicator illustrated in Fig. 16 like that in Fig. 3, is provided with a clutch mechanism M, only a portion of which is shown, a Moebius belt 28, and a relay 93 for connecting the circuit making elements of the wheels to a source of code signals.

In Fig. 16, a front wheel 103 molded of a suitable insulating material, is rotatably mounted on the front shaft 12 in the manner described, the wheel 103 being provided with the magnetic detent means 16, 17 previously described. The front wheel 103 is molded with a flanged rim 103a (Fig. 17) formed with eight pairs of equally spaced, radially extending, semi-circular extensions or lugs 103b to engage the notches 28a of the Moebius belt, and stepped peripheral shoulders 103c and 103d between the flanges of the rim. Molded in the front wheel 103 and forming a part thereof are two conducting rings 104 and 105; the ring 104 (Fig. 18) hereinafter being referred to as the front outer ring, and the ring 105 (Fig. 19) as the front inner ring.

The front outer ring 104 is a continuous annular band, the outer periphery 104a of which lies exposed within the flanged rim of the front wheel on the annular shoulder 103c. The outer ring is formed with two arcuate sections 104b and 104c which are at right angles to the ring and lie exposed on the outer surface of the front wheel. The arcuate sections are spaced 45° apart; the section 104b being approximately one-eighth the circumferential distance of the front wheel, while section 104c is three times as long.

The front inner ring 105 is also a continuous annular band, the outer periphery 105a of which lies exposed on the annular shoulder 103d within the flanged rim of the wheel. The inner ring is also formed with two arcuate sections 105b and 105c which are normal to the ring and lie exposed on the outer surface of the front wheel between the arcuate sections 104b and 104c of the front outer ring. The arcuate sections 104b, 105b, 104c and 105c form a discontinuous ring on the outer surface of the front wheel, each of the sections being separated by a strip of the insulation material forming the wheel. The arcuate sections 104b and 104c have been marked "O" and the sections 105b and 105c marked "I" to more readily distinguish the outer and inner ring sections.

The data indicator illustrated in Fig. 16 is provided with a rear wheel 106 which is rotatably mounted on an eccentrically positioned shaft 23 already described. The rear wheel 106 is molded of an insulation material, and like the rear wheel 21 in Fig. 3 is a seven-position wheel. Molded in the rear wheel 106 is an outer ring 107 and an inner ring 108 (Fig. 20), both rings being made of a conducting material. The outer and inner rings 107 and 108 are continuous annular bands, the outer peripheries 107a and 108a of which lie exposed on stepped shoulders 106a and 106b, respectively, within the flanged rim of the rear wheel. The outer ring is provided with arcuate sections 107b and 107c which lie exposed on the surface of the rear wheel, while the inner ring 108 is similarly provided with arcuate sections 108b and 108c.

The arcuate sections 107b, 108b, 107c and 108c form a discontinuous ring on the surface of the rear wheel, sections 107b and 108b each being one-seventh the circumferential distance, while sections 107c and 108c being two-sevenths and three-sevenths of the circumferential distance of the rear wheel, respectively. The arcuate sections of the outer and inner rings of the rear wheel have been marked "O" and "I," respectively.

Contact marking elements or brushes are now provided to ride over the peripheries of the outer and inner rings of the front and rear wheels and over the arcuate sections of the rings carried on the face of the wheels.

To this end there is secured within the casing to the side wall 2 as by screws 109, a brush holder block 110 made of insulation material (Fig. 21), the block being intermediate the front wheel 103 and the relay 93 with the Moebius belt 28 passing thereover and thereunder. Secured within suitable recesses formed in the face of the block 110 are three contact brushes 111, 112 and 113 made of suitable conducting material and so formed as to extend over the face of the front wheel and engage the arcuate sections of the front outer and inner rings 104 and 105. The ends of the brushes engaging the arcuate sections are spaced 45° apart. Two additional contact brushes 114 and 115 are also secured to the block 110 to engage the peripheries of the outer and inner rings. The brush 114 is secured within a suitable recess in the top of the block 110 with its free end engaging the periphery 105a of the inner ring, while brush 115 is secured to the bottom of the block with its free end engaging the periphery 104a of the outer ring.

A similar brush holder block 116 is secured within the casing intermediate the relay 93 and the rear wheel 106, the block supporting contact brushes 117, 118 and 119 on its face and contact brushes 120 and 121 on its top and bottom surfaces, respectively. The brushes 117, 118 and 119 are formed to engage the arcuate sections of the rear outer and inner rings 107 and 108, the points of brush engagement being spaced approximately 51.1° apart. The contact brushes 120 and 121 engage the respective peripheries of the inner and outer rings 108 and 107, which peripheries lie exposed within the flanged rim of the rear wheel. The spring fingers 97, 98 and 99 of the relay 93 are adapted to engage the brush contacts 111, 112 and 113, respectively, and spring fingers 100, 101 and 102 are adapted to engage the brush contacts 117, 118 and 119, respectively, when the relay 93 is energized in the manner described.

The circuit connections for the circuit controllers, magnetic clutch and relay of the indicator illustrated in Fig. 16 are the same as those described in connection with the indicator illustrated in Fig. 3, and the operation of the indicator is the same as that already described.

Figure 23:
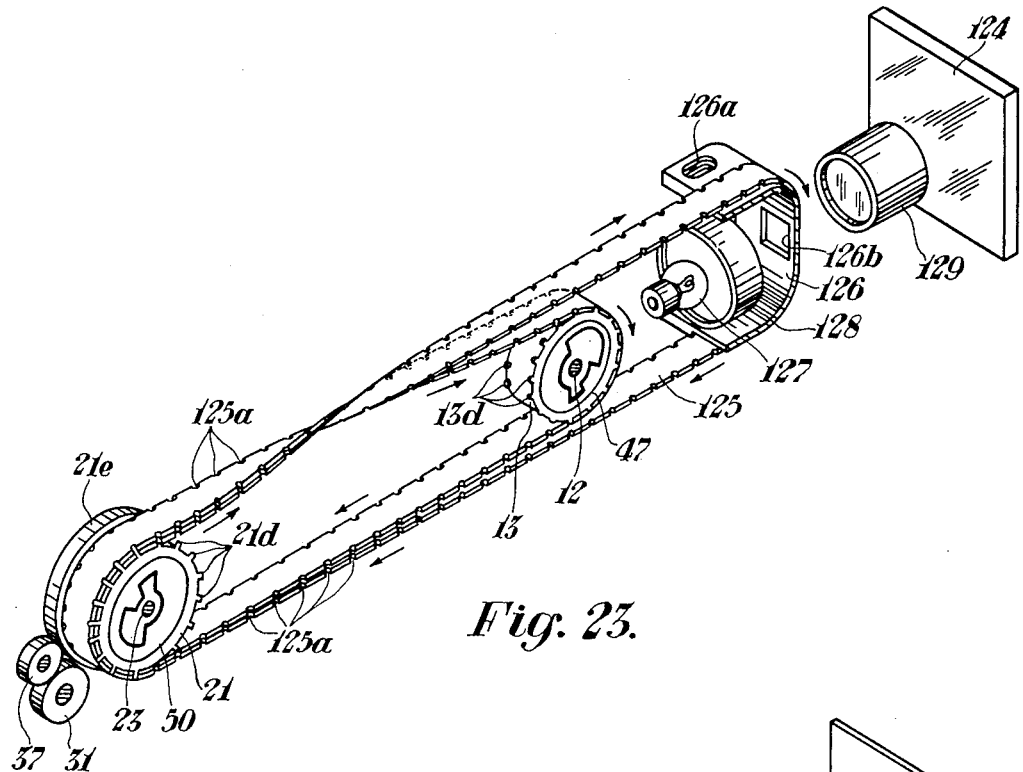
Fig. 23 is an isometric view of the details of a double Moebius belt arrangement for my novel indicator together with the elements of an image projection system.

In Fig. 23 of the drawings, I have illustrated a belt arrangement for my indicator whereby the intelligence carried by the belt is projected by a lens system onto a screen forming the front panel of the indicator. The belt arrangement is illustrated as being advanced by the wheel arrangement shown in Figs. 2 to 15, it being readily appreciated that the belt arrangement may be advanced by the wheel arrangement shown in Figs. 16 to 21.

To accommodate the projection system illustrated, the indicator 1 is modified to provide a viewing plate or screen 124 in place of the molded cover member at the front end of the indicator casing C. The viewing plate 124 is translucent and may be made of glass or a suitable transparent plastic with an etched surface. The belt arrangement comprises an endless belt 125 divided into fifty-six or more spaces for the reasons hereinbefore set forth; each of the spaces carrying a symbol or other intelligence, an image of which may be projected onto the viewing plate 124. I prefer to use a developed film strip as the endless belt, each frame of the developed strip carrying the required intelligence. The endless belt 125 is a double "Moebius" made from a strip of material of suitable length and wherein one end of the strip is twisted two complete revolutions, or 720°, before the two ends are secured together to form the endless belt. After the ends are secured together the double "Moebius" belt 125 is twisted into two loops, an outer and an inner loop; the outer loop being slightly longer than the inner loop. The belt is so twisted that the 180° twist in each loop is adjacent to each other as illustrated. One way in which the inner and outer loops may be formed is to spread the loop so that one twist of the belt is along one side of the loop and three twists are along the other side of the loop. Grasping the ends of the loops in each hand with the twists in the sides as described and twisting one end of the loop in a direction in which the loop tends to turn, the one end of the loop is superimposed on the other end of the loop and held by the one hand. The free hand may then spread the two loops thus formed to provide the inner and outer loops as illustrated in Fig. 23.

The inner loop is carried by the front and rear wheels 13 and 21 of the indicator, while the outer loop passes over the rear wheel 21 and a film guide 126 adjustably secured within the casing C between the front wheel 13 and the viewing plate 124. The sprocket notches 125a of the double "Moebius" belt are engaged by the projections or sprocket teeth 13d and 21d of the front and rear wheels, respectively. It will be readily appreciated that the sprocket teeth 21d of the rear wheel will engage the sprocket notches 125a of both the inner and outer loops of the belt 125, thereby insuring a positive drive for both loops of the belt.

The film guide 126 provided for the outer loop of the double "Moebius" belt is adjustably secured within the casing C by screws (not shown) passing through the slotted ends 126a of the guide in a manner more fully illustrated and described in my copending application for Letters Patent of the United States, Serial No. 285,337, filed on April 30, 1952, for Remotely Controlled Indicator. After the "Moebius" belt 125 is in place, any slackness in the belt may be taken up by the adjustable film guide. The film guide 126 is formed with an aperture 126b with which the individual frames of the double Moebius belt register. Interposed between the front wheel 13 and the film guide 126 are a light source or lamp 127 and a condenser lens 128. In optical alignment with the lamp, condenser lens and aperture 126b in the film guide, and between the film guide and viewing plate 124, is a projection lens 129 of suitable focal length. Circuit connections (not shown) for the lamp 127 are made through the prong connectors 43 at the rear of casing C.

The operation of my novel indicator provided with the double "Moebius" belt and the projection system described, is the same as that hereinbefore described. The energization of the clutch magnet 32 will engage the idler wheel 37 with the continuously rotating driving wheel 31 and the driving rim 21e of the rear wheel 21 to advance the double "Moebius" belt 125. Assuming clockwise rotation for the rear wheel 21 in Fig. 23, both the inner and outer loops of the belt will be moved in the same direction as indicated by the arrows. Upon de-energization of the clutch magnet in the manner described, the advance of the belt 125 will be stopped with a particular frame of the belt registering with the aperture 126b of the film guide. An image of the intelligence carried by the registering film frame is thus projected onto the viewing plate 124.

Figure 24:
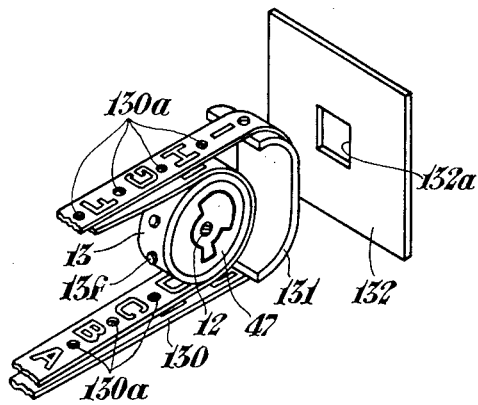
Figure 25:
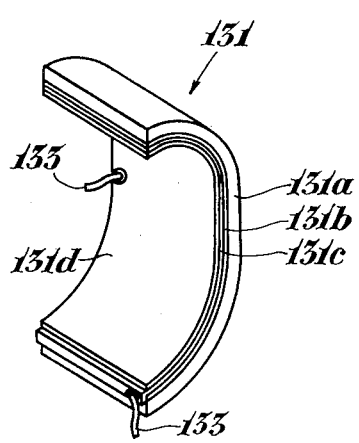
Fig. 25 is an enlarged detail view of the reflective light source illustrated in Fig. 24.

In Figs. 24 and 25 of the drawings, I have illustrated another way of displaying the symbols or intelligence carried by an endless belt of my novel indicator. A double "Moebius" belt 130 is provided for the indicator, the belt being preferably of the developed film strip type described. The belt 130 is provided with centrally disposed sprocket holes 130a between the frames of the film strip. As previously described, the belt is twisted into inner and outer loops, the inner loops passing over the front and rear wheels of the indicator, only the front wheel 13 being illustrated. With the centrally disposed sprocket holes in the belt 130, the rear wheel is provided with centrally disposed sprocket teeth (not shown) similar to the sprocket teeth 13f illustrated on front wheel 13. The outer loop of the double "Moebius" belt 130 passes over the rear wheel 21 in the manner previously described, and over a lighted panel 131 secured within the casing C in front of the front wheel 13 and adjacent to an opaque cover panel 132 secured to the front end of the casing C. For purposes of clarity, the panel 132 in Fig. 24 is illustrated as being spaced from the lighted panel 131. It will be understood, however, that the lighted panel 131 and panel 132 are spaced apart a distance slightly greater than the thickness of the belt 130. The panel 132 is formed with an aperture 132a with which the frame of the endless belt will register. The aperture 132a may be provided with a glass insert or cover, if desired.

The lighted panel 131 is of the type known as a luminous condenser and produces a "cold" light by electroluminescence. The panel comprises a bowed glass member 131a, having its inner surface coated with a transparent conducting film 131b. The transparent conducting film is coated with a layer 131c of light producing phosphor dispersed in a dielectric material, and backed by a conducting layer 131d, as for example, aluminum. The conducting film 131b and layer 131d are connected by leads 133 to a source of suitable power through the prong connectors 43 at the rear of the casing C. With power on, the panel 131 will glow to illuminate the intelligence carried by the endless belt of the indicator. The intelligence carried by the belt will be visible through the aperture 132a of the front panel against the luminous background provided by the panel 131.

It will be readily appreciated that I have provided a remotely controlled indicator responsive to energy transmitted in different binary code combinations which is particularly well adapted for use in a display panel or board. An indicator embodying my invention is compact in design, quiet in operation and readily installed or removed from a display panel or board. The indicator provided by me is further characterized by its flexibility in adaption to various binary code systems and by its possible use as a code transmitter. The magnetic detent provided in the indicator insures the proper positioning of the characters or symbols carried by the Moebius belt, while the magnetic clutch and the selectively controlled relay forming a part of the indicator, reduce the number of parts formerly installed in relay boards or panels used in conjunction with the display panel or boards.

Although I have herein shown and described two forms of indicators embodying my invention, it is understood that various changes and modifications may be made therein within the scope of the appended claims without departing from the spirit and scope of my invention.

Having thus described my invention, what I claim is:

1. An indicator comprising a casing, a movable member in said casing having a plurality of predetermined positions each selectable by a code signal, circuit making elements in said casing operative by said movable member, electromagnetic means in said casing including contact making elements actuated by said electromagnetic means for connecting said circuit making elements to a code signal source, motive means for moving said movable member, and magnetic clutch means connected by said circuit making elements to the code signal source and operative in response to code signals to connect said motive means and said movable member to move said member to a position responsive to the code signal received.

2. An indicator comprising a casing, a movable member in said casing having a plurality of predetermined positions each selectable by a code signal, circuit making elements in said casing operative by said movable member, electromagnetic means in said casing including contact making elements actuated by said electromagnetic means for connecting said circuit making elements to a code signal source, motive means externally of said casing for moving said movable member, and magnetic clutch means within said casing and electrically connected by said circuit making elements to the code signal source and operative in response to code signals to connect said motive means and said movable member to move said member to a position responsive to the code signal received.

3. An indicator comprising a casing of magnetic material, a movable member in said casing having a plurality of predetermined positions each selectable by a code signal, circuit making elements in said casing operative by said movable member; a coil structure including a magnetic core, resiliently supported within said casing away from the sides thereof, said core and casing forming a magnetic circuit for said coil structure whereby said structure moves toward a side of said casing upon energization of said coil structure; contact fingers supported by said coil structure adapted to connect said circuit making elements to a code signal source upon energization of said coil structure, motive means for moving said movable member, and magnetic clutch means connected by said circuit making elements to the code signal source and operative in response to code signals to connect said motive means and said movable member whereby said member is moved to a position selected by the code signal received.

4. An indicator comprising a casing, a viewing plate for said casing, two sprocket wheels divided into a predetermined number of spaces of equal length and rotatably mounted on parallel axes within said casing, a belt carried by said sprocket wheels having a plurality of spaces each selectable by a code signal for positioning within said viewing plate, circuit making elements associated with each wheel including a commutating surface carried on the face of said wheel, and a plurality of brushes adapted to engage predefined portions of said commutating surface; means for connecting the circuit making elements of said wheels to a code signal source, motive means for driving said wheels and belt, and magnetic clutch means within said casing connected by said circuit making elements to the code signal source and operative in response to code signals to couple said motive means and one of said wheels to advance said belt to a position selected by the code signal received, wherein a predetermined belt space is positioned within said viewing plate.

5. An indicator comprising a casing, a viewing plate for said casing, two sprocket wheels divided into a predetermined number of spaces of equal length and rotatably mounted on parallel axes within said casing, a belt carried by said sprocket wheels having a plurality of spaces each selectable by a code signal for positioning within said viewing plate, circuit making elements associated with each wheel including a commutating surface carried on each wheel, and a plurality of brushes adapted to engage predefined portions of said commutating surface; means for connecting the circuit making elements of said wheels to a code signal source, motive means for driving said wheels and belt, a magnetic clutch means within said casing operative in response to code signals to couple said motive means and one of said wheels to advance said belt to a position selected by the code signal received, wherein a predetermined belt space is positioned within said viewing plate, a magnetizable ring rotatable with one of said wheels, said ring being provided with a number of pole faces equal to the number of spaces of said wheel, and a magnet adjustably secured to said casing cooperating with said magnetizable ring to hold the selected space of said belt in centered position within said viewing plate.

6. An indicator comprising a casing of magnetic material, a viewing plate for said casing, two sprocket wheels divided into a predetermined number of spaces of equal length and rotatably mounted on parallel axes within said casing, a belt carried by said sprocket wheels having a plurality of spaces each selectable by a code signal for positioning within said viewing plate, circuit making elements associated with each wheel including a commutating surface carried on the face of the wheel and continuous rings on the periphery of the wheel, a support plate secured to said casing, and a plurality of brushes secured to said support plate adapted to engage said commutating surface at predetermined angular positions and said continuous rings; a coil structure including a magnetizable core resiliently supported within said casing away from the walls thereof, contact fingers secured to said coil structure adapted to engage individual brushes on said support plates when said coil structure is energized and moves toward a wall of said casing to connect the circuit making elements of said wheels to a code signal source, motive means externally of said casing for driving said wheels and belt, magnetic clutch means within said casing connected with said circuit making elements to the code signal source and operative in response to code signals to couple said motive means and one of said wheels to advance said belt to a position selected by the code signal received, wherein a predetermined belt space is positioned within said viewing plate, a magnetizable ring rotatable with one of said wheels, said ring being provided with a number of pole faces equal to the number of spaces of said wheel, and a magnet adjustably secured to said casing cooperating with said magnetizable ring to hold the selected space of said belt in centered position within said viewing plate.

7. An indicator comprising a casing of magnetic material, a viewing plate for said casing, two sprocket wheels divided into a predetermined number of spaces of equal length and rotatably mounted on parallel axes within said casing, a belt carried by said sprocket wheels having a number of spaces equal to the product of the number of spaces on said wheels, each space being selectable by a code signal for positioning within said viewing plate; circuit making elements associated with each wheel including a commutating surface carried on the face of said wheel, a first support plate adjustably secured to said casing, and a plurality of brushes secured to said first support plate adapted to engage predefined portions of said commutating surface; a second support plate secured to said casing adjacent each wheel, bus bars on said second support plates individually engaged by the brushes on said first support plates, a coil structure including a magnetizable core resiliently supported within said casing away from the walls thereof, contact fingers secured to said coil structure adapted to engage individual bus bars on said second support plates when said coil structure is energized and moves toward a wall of said casing to connect the circuit making elements of said wheels to a code signal source, motive means for driving said wheels and belt, magnetic clutch means within said casing connected with said circuit making elements to the code signal source and operative in response to code signals to couple said motive means and one of said wheels to advance said belt to a position selected by the code signal received, wherein a predetermined belt space is positioned within said viewing plate, a magnetizable ring rotatable with one of said wheels, said ring being provided with a number of pole faces equal to the number of spaces of said wheel, and a magnet adjustably secured to said casing cooperating with said magnetizable ring to hold the selected space of said belt in centered position within said viewing plate.

8. An indicator comprising a casing of magnetic material, a viewing plate for said casing, two sprocket wheels divided into a predetermined number of spaces of equal length and rotatably mounted on parallel axes within said casing, a belt carried by said sprocket wheels having a plurality of spaces equal in length to the length of the wheel spaces, each belt space being selectable by a code signal for positioning within said viewing plate; circuit making elements associated with each wheel including a commutating surface carried on the face of said wheel, a first support plate adjustably secured to said casing, and a plurality of brushes secured to said first support plate adapted to engage predefined portions of said commutating surfaces; a second support plate secured to said casing adjacent each wheel, bus bars on said second support plates individually engaged by the brushes on said first support plates, a coil structure including a magnetizable core resiliently supported within said casing away from the walls thereof, contact fingers secured to said coil structure adapted to engage individual bus bars on said second support plates when said coil structure is energized and moves toward a wall of said casing to connect the circuit making elements of said wheels to a code signal source, motive means for driving said wheels and belt, and magnetic clutch means within said casing connected with said circuit making elements to the code signal source and operative in response to code signals to couple said motive means and one of said wheels to advance said belt to a position selected by the code signal received, wherein a predetermined belt space is positioned within said viewing plate.

9. An indicator comprising a casing of magnetic material, a viewing plate for said casing, two sprocket wheels divided into a predetermined number of spaces of equal length and rotatably mounted on parallel axes within said casing, one of said wheels being rotatably mounted on an eccentrically mounted shaft; a belt carried by said sprocket wheels having a plurality of spaces each selectable by a code signal for positioning within said viewing plate; circuit making elements associated with each wheel including a commutating surface carried on the face of said wheel, a first support plate adjustably secured to said casing, and a plurality of brushes secured to said first support plate adapted to engage predefined portions of said commutating surface; a second support plate secured to said casing adjacent each wheel, bus bars on said second support plates individually engaged by the brushes on said first support plates, a coil structure including a magnetizable core resiliently supported within said casing away from the walls thereof, contact fingers secured to said coil structure adapted to engage individual bus bars on said second support plates when said coil structure is energized and moves toward a wall of said casing to connect the circuit making elements of said wheels to a code signal source, motive means externally of said casing for driving said wheels and belt, magnetic clutch means within said casing connected with said circuit making elements to the code signal source and operative in response to code signals to couple said motive means and one of said wheels to advance said belt to a position selected by the code signal received, wherein a predetermined belt space is positioned within said viewing plate, a magnetizable ring rotatable with one of said wheels, said ring being provided with a number of pole faces equal to the number of spaces on said wheel, and a magnet adjustably secured to said casing cooperating with said magnetizable ring to hold the selected space of said belt in centered position within said viewing plate.

10. In a casing of magnetic material, the combination comprising a coil structure within said casing including a magnetizable core, and nonmagnetic spring means secured within said casing and resiliently biasing said structure away from said casing, said coil structure upon energization thereof moving toward said casing against the bias of said spring means.

11. In a casing of magnetic material, the combination comprising fixed contacts within said casing, a coil structure within said casing including a magnetizable core, nonmagnetic spring means secured within said casing and resiliently biasing said structure away from said casing, and contact fingers secured to said coil structure adapted to engage said fixed contacts when said coil structure is energized, said coil structure upon energization thereof moving toward said casing against the bias of said spring means.

12. Circuit making elements for a rotatable member comprising a commutating surface carried on the face of said member, a first support plate of insulation material adjacent said member, a plurality of brushes secured to said first support plate adapted to engage said commutating surface at predetermined points, a second support plate of insulation material adjacent said first plate, bus bars on said second support plate individually engaged by the brushes on said first support plate, and means including movable contacts for engaging and connecting said bus bars into an electrical circuit.

13. A circuit making element comprising a rotatable member of insulating material having two peripheral shoulders, and two conducting rings of different diameters embedded in the body of said member; each of said rings being formed with a flat peripheral surface which lies exposed on a peripheral shoulder of said member and arcuate segments of different lengths normal to the flat peripheral surfaces of the rings, said segments lie exposed on the face of said member forming a discontinuous conducting surface on said member.

14. A circuit making element comprising a rotatable member of insulating material having two peripheral shoulders, and two conducting rings of different diameters embedded in the body of said member; each of said rings being formed with a flat peripheral surface which lies exposed on a peripheral shoulder of said member and arcuate segments of different lengths normal to the flat peripheral surfaces of the rings, said segments lie exposed on the face of said member forming a discontinuous conducting surface on said member, said arcuate sections being so formed on their respective rings that the arcuate sections of one ring lie between the arcuate sections of the other ring on the surface of said member.

15. In an indicator having means for advancing an endless belt and means for viewing the intelligence carried by the endless belt, a double Moebius belt twisted into inner and outer loops and advanced by said advancing means past said viewing means.

16. In an indicator having means for advancing an endless belt and means for viewing the intelligence carried by the endless belt, a double Moebius belt twisted into inner and outer loops, and a belt guide element separating the inner and outer loops as both loops are advanced by said advancing means past said viewing means.

17. In an indicator having means for advancing an endless belt and means for viewing the intelligence carried by the endless belt, a double Moebius belt twisted into inner and outer loops, and a belt guide element separating the inner and outer loops as both loops are advanced by said advancing means past said viewing means, said belt guide element being a luminous body for illuminating the intelligence carried by the double Moebius belt.

18. In an indicator having means for advancing an endless belt and means for viewing the intelligence carried by the endless belt, a double Moebius belt twisted into inner and outer loops, and a belt guide element separating the inner and outer loops as both loops are advanced by said advancing means past said viewing means, the double Moebius belt carrying projectable intelligence, said belt guide element being formed with an aperture, and a projection system including a light source in optical alignment with said aperture for projecting an image of the intelligence carried by said belt past the aperture in said element onto the viewing means of the indicator.

19. In an indicator, the combination comprising three spaced supporting members, a double Moebius belt twisted into inner and outer loops, the inner loop being supported by the first and second of said members while the outer loop is supported by the one of said enumerated members and the third of said members, and means forming a part of at least one of said members for advancing said Moebius belt.

20. In an indicator, the combination comprising three spaced supporting members, and a double Moebius belt carrying intelligence, said belt being twisted into inner and outer loops, the inner loop being supported by the first and second of said supporting members, the outer loop being supported by the first and third of said supporting members, one of said member including means for advancing the loops of the Moebius belt, another of said members being a luminous body for illuminating the intelligence carried by said belt.

21. In an indicator, the combination comprising three spaced supporting members, a double Moebius belt carrying projectable intelligence, said belt being twisted into inner and outer loops; the inner loop being supported by the first and second of the supporting members, the outer loop being supported by the first and third of the supporting members; one of said supporting members including means for advancing the loops of the Moebius belt, another of said supporting members being formed with an aperture; a viewing plate, and a projection system including a light source in optical alignment with said aperture for projecting an image of the intelligence carried by said belt registering with the aperture in the supporting member onto said viewing plate.

References Cited in the file of this patent

UNITED STATES PATENTS

| Number | Name | Date |
| --- | --- | --- |
| 953,584 | Bishop et al. | Mar. 29, 1910 |
| 1,603,646 | Sperry | Oct. 19, 1926 |
| 1,627,168 | Ford | May 3, 1927 |
| 1,783,444 | Nagem | Dec. 3, 1929 |
| 1,912,090 | Norviel | May 30, 1933 |
| 2,074,066 | Wheeler | Mar. 16, 1937 |
| 2,109,991 | French | Mar. 1, 1938 |
| 2,241,548 | Frischknecht | May 13, 1941 |
| 2,455,210 | Anderson | Nov. 30, 1948 |
| 2,465,933 | Rowe | Mar. 29, 1949 |
| 2,466,133 | Thompson | Apr. 5, 1949 |
| 2,617,870 | Kern | Nov. 11, 1952 |

FOREIGN PATENTS

| Number | Country | Date |
| --- | --- | --- |
| 19,603 | Great Britain | Aug. 26, 1909 |
| 255,968 | Great Britain | Aug. 5, 1926 |